(12) United States Patent
Sugano

(10) Patent No.: US 8,591,038 B2
(45) Date of Patent: Nov. 26, 2013

(54) PROJECTION TYPE IMAGE DISPLAY APPARATUS INCLUDING SCREEN CONFIGURED TO PARTIALLY SUPPORT MIRROR

(75) Inventor: Norichika Sugano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 13/053,855

(22) Filed: Mar. 22, 2011

(65) Prior Publication Data

US 2011/0234995 A1 Sep. 29, 2011

(30) Foreign Application Priority Data

Mar. 23, 2010 (JP) ................. P.2010-066257

(51) Int. Cl.
*G03B 21/28* (2006.01)
*G03B 21/56* (2006.01)
*G02B 7/182* (2006.01)
*H04N 5/64* (2006.01)

(52) U.S. Cl.
USPC .......... 353/77; 353/98; 353/119; 359/871; 359/453; 359/460; 359/449; 348/794; 348/788; 348/789; 348/836

(58) Field of Classification Search
USPC .......... 353/77, 74, 98–99, 119; 359/871, 453, 359/443, 460, 449; 348/794, 787, 788, 789, 348/836
See application file for complete search history.

(56) References Cited

U.S. PATENT DOCUMENTS

| 6,921,174 B1 * | 7/2005 | Duggan et al. ............. 353/74 |
| 2005/0018148 A1 | 1/2005 | Hasegawa |
| 2007/0177063 A1 | 8/2007 | Hiramatsu |
| 2007/0279599 A1 * | 12/2007 | Michimori et al. ........ 353/74 |
| 2008/0186606 A1 | 8/2008 | Sugano |
| 2008/0252861 A1 * | 10/2008 | Niikura et al. ............ 353/77 |
| 2009/0115972 A1 * | 5/2009 | Aizawa et al. ............ 353/74 |
| 2011/0188009 A1 * | 8/2011 | Matsui ..................... 353/98 |

FOREIGN PATENT DOCUMENTS

| JP | S59-63355 U | 4/1984 |
| JP | H04-42639 U | 4/1992 |
| JP | H7-175130 A | 7/1995 |
| JP | 2005-43681 A | 2/2005 |
| JP | 2007-183301 A | 7/2007 |

* cited by examiner

*Primary Examiner* — Georgia Y Epps
*Assistant Examiner* — Magda Cruz
(74) *Attorney, Agent, or Firm* — Birch, Stewart, Kolasch & Birch, LLP

(57) ABSTRACT

A projection type image display apparatus in one aspect of the present invention includes an optical engine that projects an image; an image display screen that displays an image of projection light projected from the optical engine; a folding mirror that reflects the projection light projected from the optical engine toward the image display screen; and an optical system support member that holds the optical engine, a rear side part of the folding mirror and the image display screen. The image display screen holds a front side part of the folding mirror by an upper side part of the image display screen.

7 Claims, 9 Drawing Sheets

PROJECTION TYPE IMAGE DISPLAY APPARATUS INCLUDING SCREEN CONFIGURED TO PARTIALLY SUPPORT MIRROR

CROSS-REFERENCE TO RELATED APPLICATION

This application claims priority from Japanese Patent Application No. 2010-066257 filed on Mar. 23, 2010, the entire subject matter of which is incorporated herein by reference.

BACKGROUND

1. Technical Field

The present invention relates to a projection type image display apparatus, and specifically, to a thin projection type image display apparatus having a shallow depth.

2. Background

In a projection type image display apparatus, an optical engine makes light from a light source with information into image light. Then, the image light is reflected by a folding mirror and is projected on a screen, and an image is displayed on the screen. In order to prevent a distortion or a blur of the image, it is necessary to keep relative angle deviations between the optical engine, the screen and the folding mirror with high precision. Specifically, in order to suppress a deformation of the folding mirror, the mirror is thickened or a rigid reinforcement member is attached on a periphery or backside of the mirror.

In addition, in order to make the projection type image display apparatus in a thin type, a ratio of an apparatus height to a depth from the screen to a rear end of the folding mirror is made to be a ratio of 10 to 3, for example, so that an angle between a projection direction to the folding mirror and a horizontal direction is made to be highly great (a projection angle is highly great). In this configuration, a slight deformation of the folding mirror arranged adjacent to a top surface of the apparatus and a relative positional deviation to the screen cause a distortion or a blur in the displayed image projected on the screen. Accordingly, the related rear projection display apparatus has a rigid frame structure for increasing a rigidity and a configuration for easily enabling angle adjustment of the folding mirror after the moving such as delivery (for example, refer to JP-A-2007-183301 (pages 6 to 10 and FIGS. 9 to 11 and 19)).

SUMMARY OF THE INVENTION

The related rear projection display apparatus requires a rigid reinforcement member at a backside of the mirror, a rigid reinforcement structure adjacent to a design frame of an upper part of the screen and a complicated structure for angel adjustment. Therefore, a width of the design frame has to be thickened, so that it is difficult for a space-saving and a simple design.

An aspect of the present invention is made in consideration of the above problems, and an object of the present invention is to provide a projection type image display apparatus that prevents a distortion or blur on a screen, which are caused by a deformation of a folding mirror, and is to achieve the space-saving and the simple design.

A projection type image display apparatus in one aspect of the present invention includes an optical engine that projects an image; an image display screen that displays an image of projection light projected from the optical engine; a folding mirror that reflects the projection light projected from the optical engine toward the image display screen; and an optical system support member that holds the optical engine, a rear side part of the folding mirror and the image display screen. The image display screen holds a front side part of the folding mirror by an upper side part of the image display screen.

According to the present invention, since the front side part of the folding mirror is held by the image display screen, a rigid reinforcement structure at an upper part of the image display apparatus is not required, so that it is possible to hold the folding mirror with saving the space. As a result, it is possible to achieve the space-saving projection type image display apparatus capable of displaying a high-definition image having little distortion or little blur with suppressing a deformation of the folding mirror.

DESCRIPTION OF PREFERRED ILLUSTRATIVE ASPECTS

First Illustrative Aspect

Figure 1:
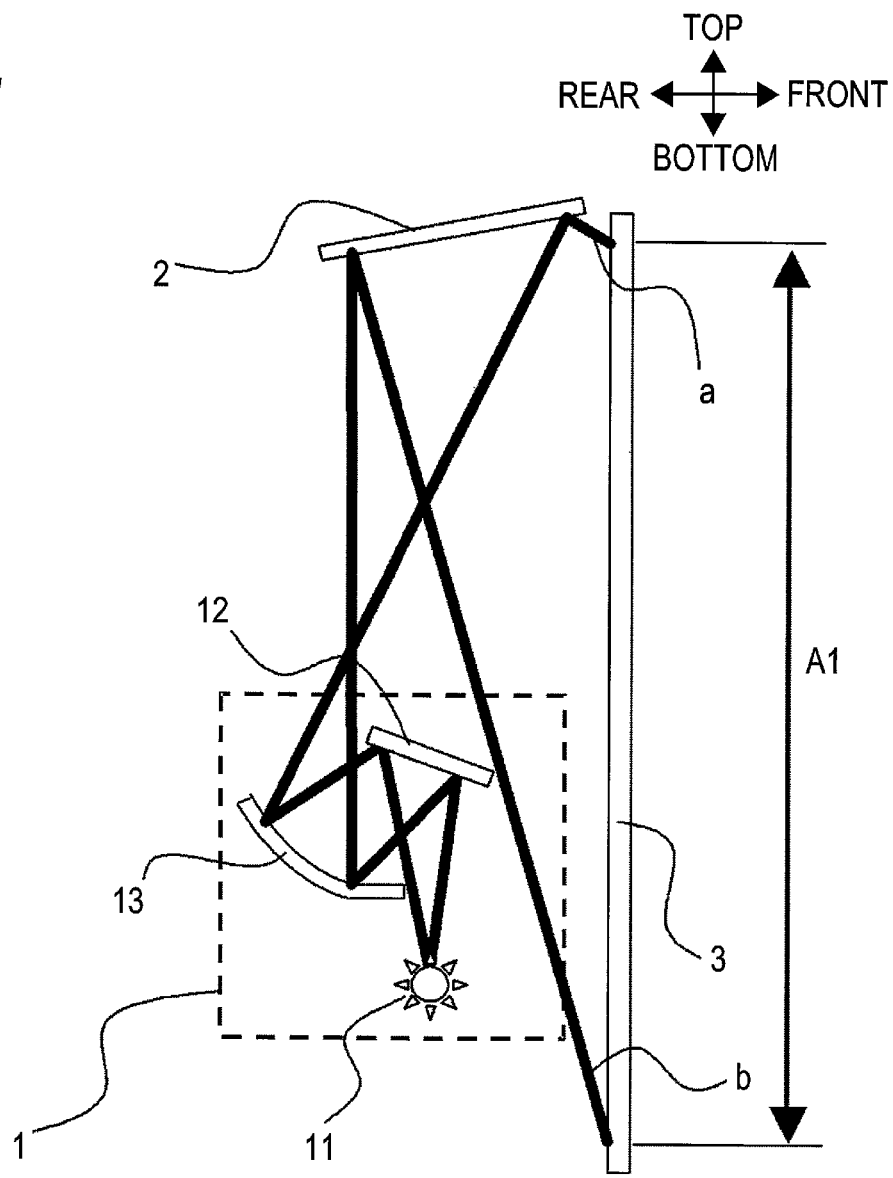
FIG. 1 is a side view showing an optical system of a projection type image display apparatus according to a first illustrative aspect of the invention.

FIG. 1 is a side view showing an optical system of a projection type image display apparatus according to a first illustrative aspect of the invention. In this FIG. 1, an optical engine 1 includes a light source 11, a first folding mirror 12 and a non-planar mirror 13. A second folding mirror 2 reflects projected light from the optical engine 1 in an upward direction and the reflected light is projected on an image display screen 3, so that an image is displayed on the image display screen 3. The reflected light "a" indicates an upper end of the image projected on the screen 3 and the reflected light "b" indicates a lower end of the image. An image range A1 is a range from the reflected light "a" to the reflected light "b" and indicates a normal image range and a normal image position on the screen 3.

Figure 2:
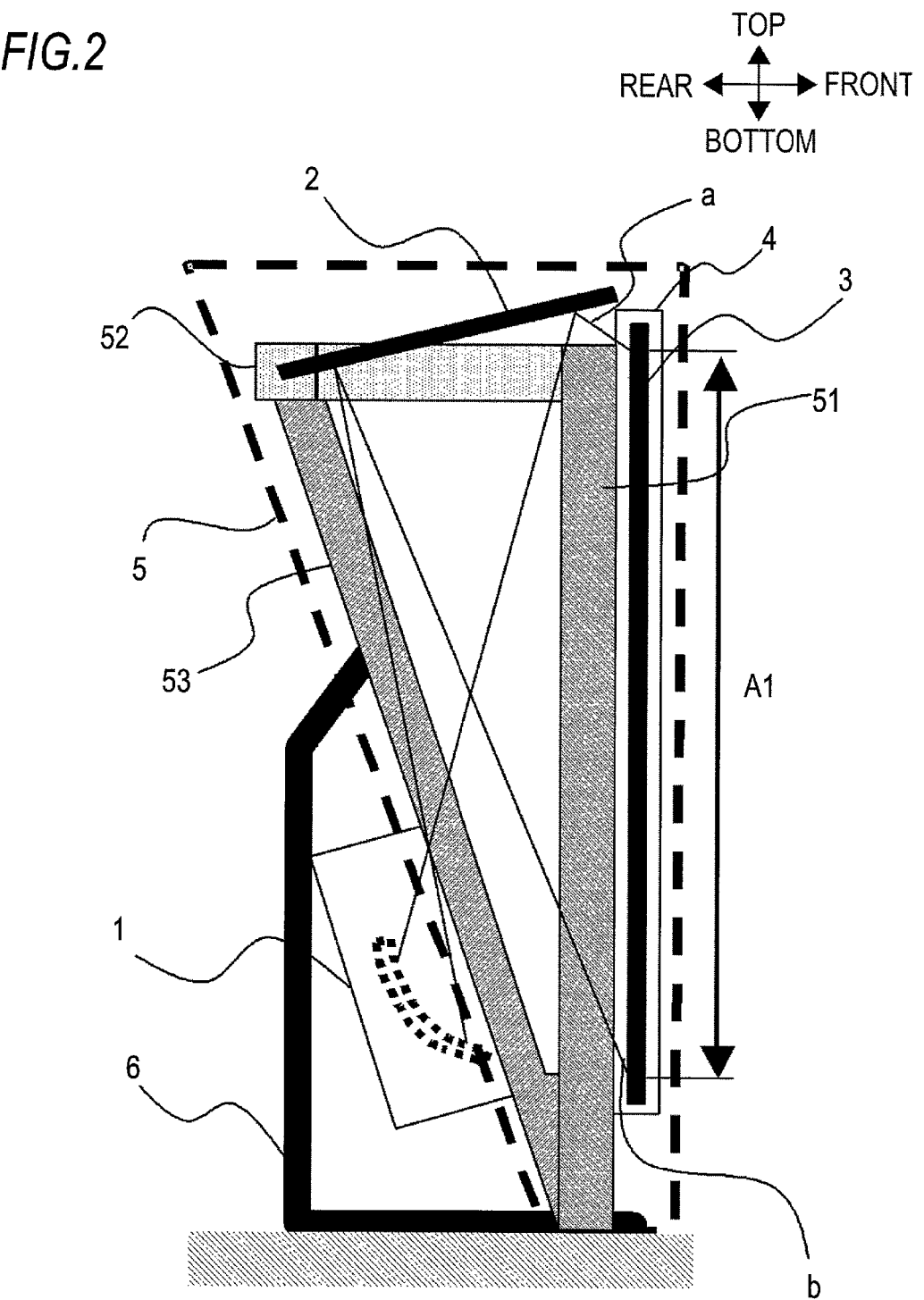
FIG. 2 is a side view showing a schematic structure of a frame of the projection type image display apparatus according to the first illustrative aspect of the invention.
Figure 3:
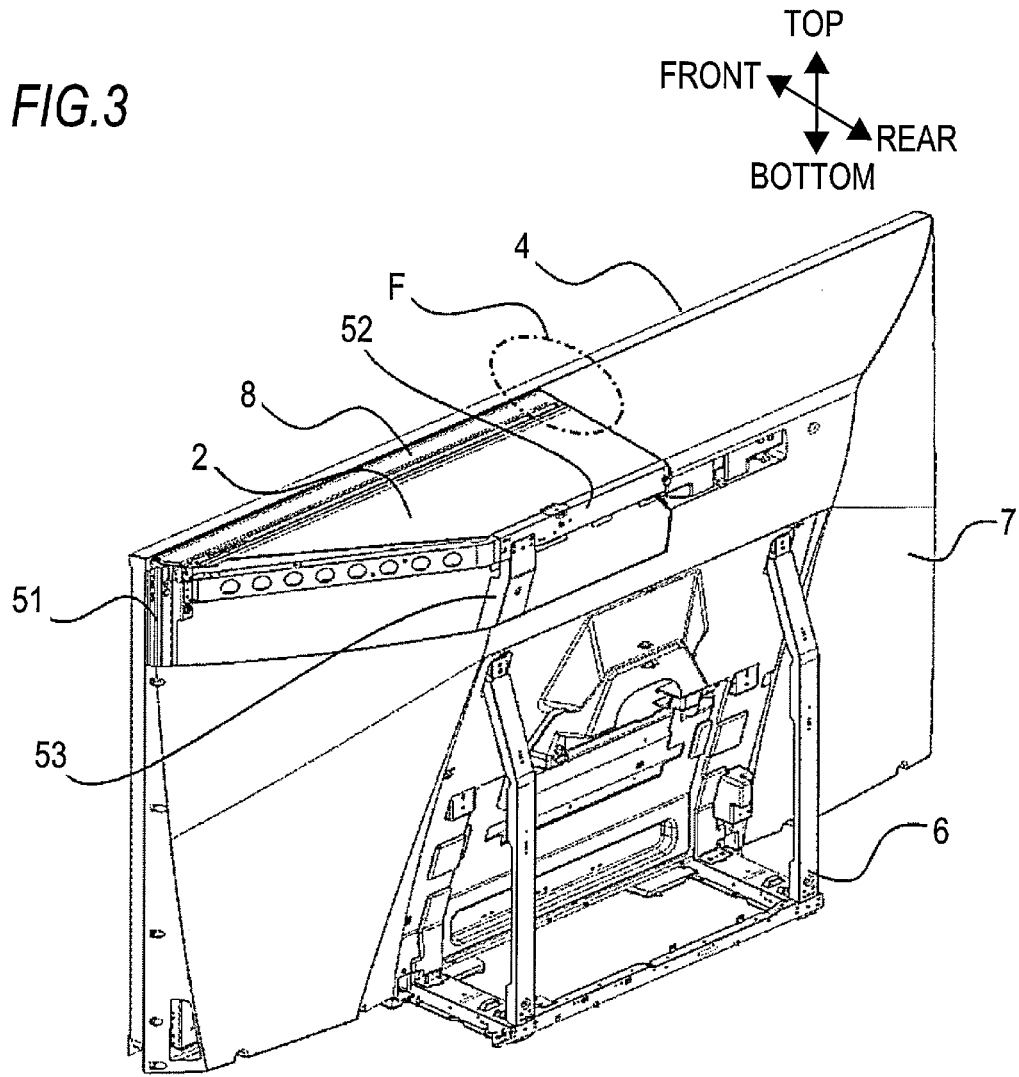
FIG. 3 is a partial perspective sectional view showing the frame structure of the projection type image display apparatus according to the first illustrative aspect of the invention.
Figure 4:
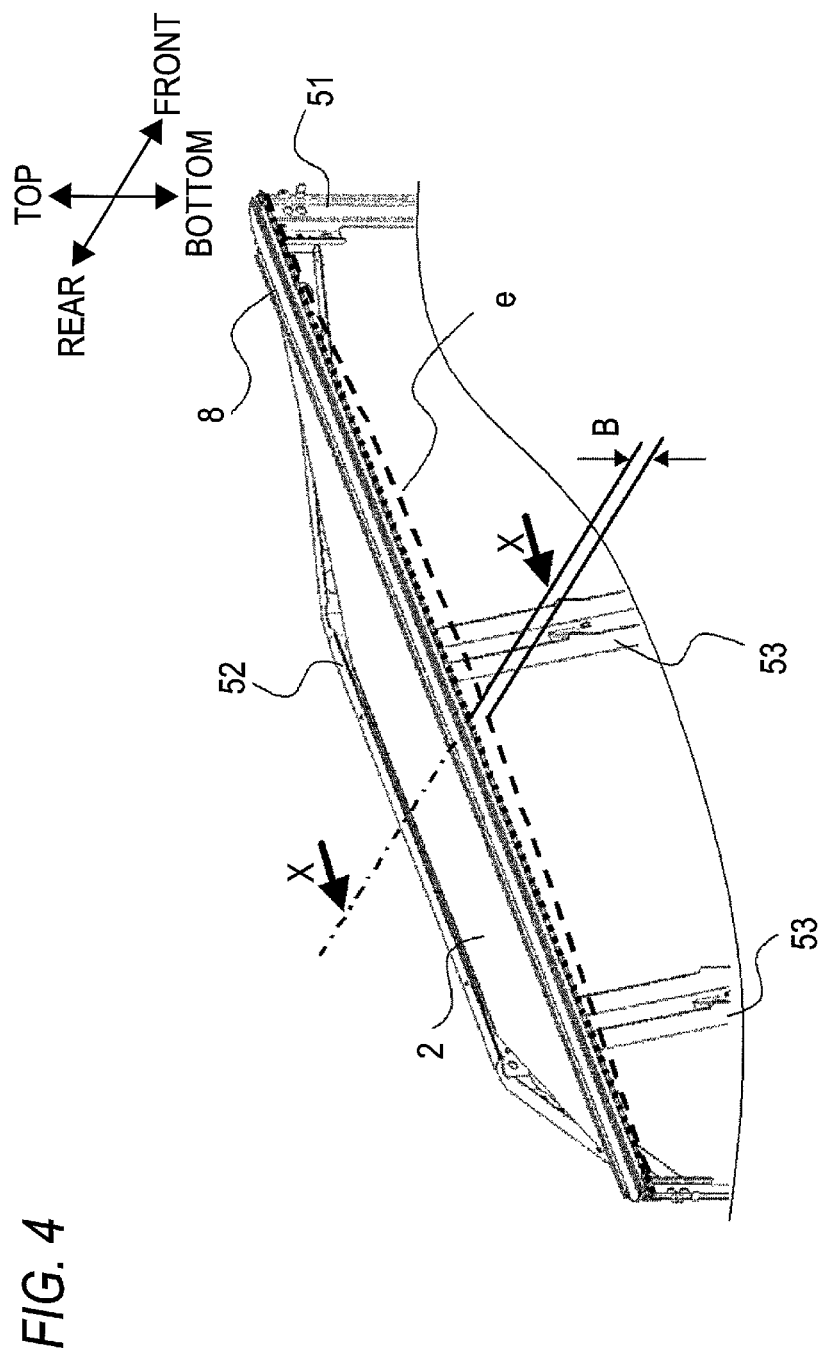
FIG. 4 is a perspective view showing an internal structure of the projection type image display apparatus according to the first illustrative aspect of the invention.

FIG. 2 is a side view showing a schematic structure of a frame of the projection type image display apparatus, FIG. 3 is a partial perspective sectional view showing the frame structure of the projection type image display apparatus as viewed from a rear side, and FIG. 4 is a perspective view showing an internal structure around the second folding mirror 2 of the projection type image display apparatus as viewed from a front side.

The projection type image display apparatus has the optical engine 1, the second folding mirror 2, the screen 3 and a screen frame 4 that holds an entire circumference of the screen 3 and also serves as a design frame, an optical system support member 5 and a bottom frame unit 6. The optical system support member 5 has a structure that holds the optical engine 1 configuring the optical elements, the second folding mirror 2, the screen 3, and the screen frame 4 that holds a screen 3, at a predetermined position. In addition, the bottom frame unit 6 is configured to self-stand the optical system support member 5 with holding the optical elements on a bottom surface. Since the optical elements are integrated in the optical system support member 5, even when the bottom frame unit 6 and the optical system support member 5 become out of alignment during the mounting, the optical system in the optical system support member 5 does not become out of alignment. Thus, it is possible to prevent the image display position from becoming out of alignment.

The optical system support member 5 includes a front frame 51, a top frame 52 and a rear frame 53. The front frame 51 includes left and right frames and a lower side frame in order to hold side and lower parts of the screen frame 4. The top frame 52 is connected to upper parts of the left and right frames of the front frame 51. The top frame 52 is a substantially trapezoidal shape formed by left and right oblique frames and a rear frame, although it does not have a front side frame. In addition, the top frame 52 holds a rear side part of the second folding mirror 2. The rear frame 53 connects a rear side part of the top frame 52 and the lower side frame of the front frame 51 and holds the optical engine 1.

The optical system support member 5 that holds the screen frame 4 is assembled with high precision and high rigidity. Thus, even when external force is applied, the optical system support member can maintain a relative position between each of the optical engine 1, the second folding mirror 2 and the screen 3, so that it maintains the image range A1 at a predetermined position.

A rear cover 7 covers the rear side of the optical system support member 5. The rear cover 7 prevents interfering by external light on the image projected from the optical engine 1, prevents leaking the reflected light of the image projected from the optical engine to the outside and prevents intruding foreign substances such as dust from the outside.

A mirror holder 8 positioned at the front end of the second folding mirror 2 is a reinforcement member that is fixed to the second folding mirror 2 by at least one of a double-sided tape and an adhesive. The mirror holder 8 suppresses a deformation of the second folding mirror 2 and prevents the damage to the second folding mirror 2 by shock such as the external force. In addition, the mirror holder also has a structure for fixing the second folding mirror 2 to upper end portions of the left and right side of the optical system support member 5.

A dashed line "e" of FIG. 4 indicates a case that the second folding mirror 2 is deformed by gravity in the related art. When strength of the mirror holder 8 is insufficient or the mirror holder 8 is not provided, the second folding mirror 8 is deformed as shown with the dashed line "e". In the case, a length B indicates a vertical deformation amount.

Figure 5:
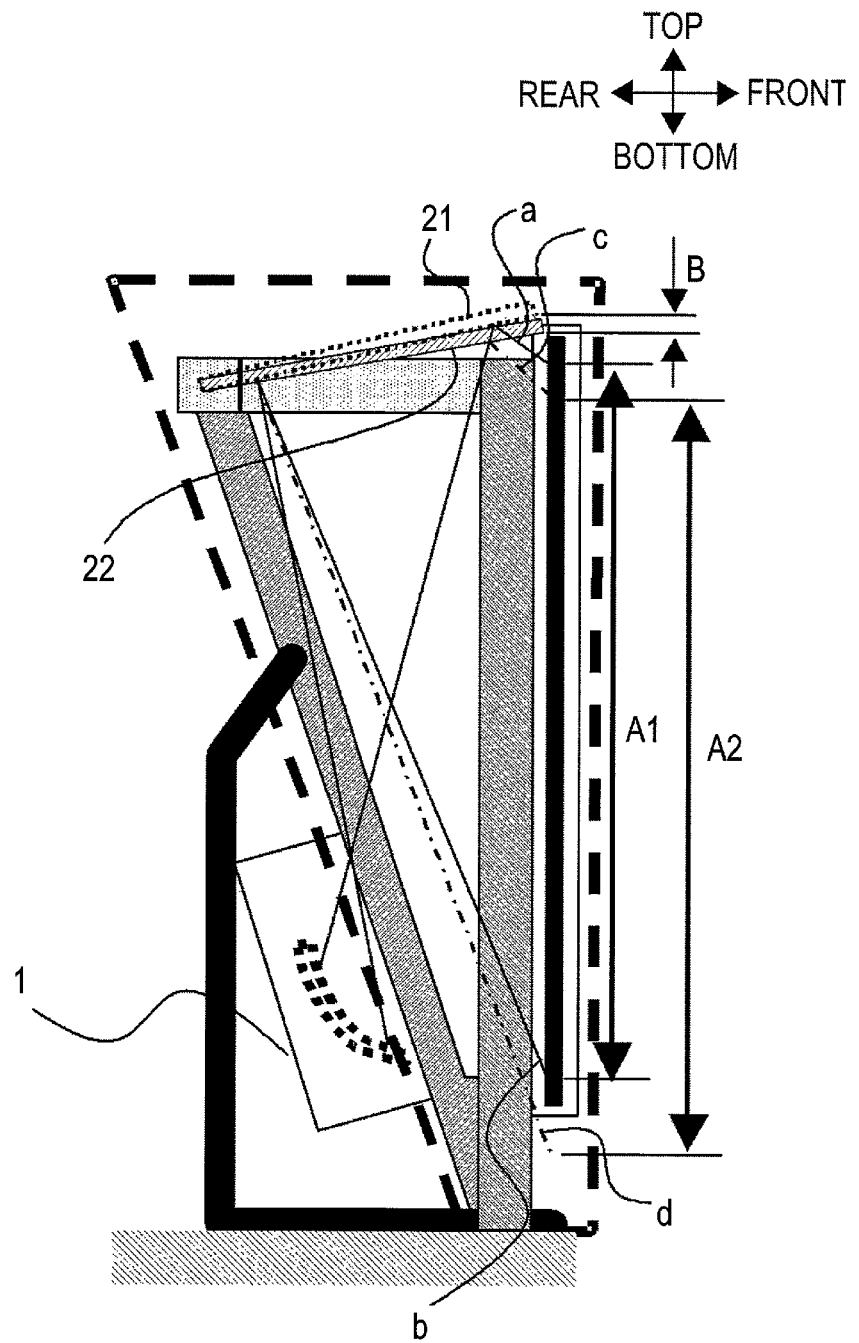
FIG. 5 is a side view showing a case of a deformed folding mirror of the projection type image display apparatus according to the first illustrative aspect of the invention.

FIG. 5 illustrates a deformation effect of the second folding mirror 2 deformed as the dashed line "e" on the image position and the image range. A second folding mirror 21 shown by a dotted line indicates a mirror position with no deformation. A second folding mirror 22 shown by a solid line indicates a sectional view of the mirror taken along a line X-X of FIG. 4 when the mirror is deformed as the dashed line "e" in FIG. 4.

When the light projected from the optical engine 1 is reflected by the mirror 21, the light is reflected to the positions of the reflective light "a" and the reflective light "b" (both are indicated by solid lines). On the other hand, when the light is reflected by the mirror 22, the reflected light "c" corresponds an upper end of the image and the reflected light "d" corresponds a lower end of the image (both are indicated by dashed-dotted lines). Therefore, in the related art, since the image position and the image range are changed from the image range A1 to the image range A2 by the deformation, there are problems that the image is missing or a part of the image is not displayed on the screen 3.

In addition, when the second folding mirror 2 is deformed as shown by the dashed line "e", a light reflected a center of the second folding mirror 2 is projected into the image range A2. However, since both ends of the second folding mirror 2 is relatively less deformed than the center of the second folding mirror 2, a light reflected both ends reflected into the image range A1. Therefore, in the related art, a displayed image as viewed from the front is distorted into a barrel shape that is bulged downwardly.

In a case of an ultra large display apparatus of 75 inches, if the length B becomes 1 mm, the downward bulging of the image becomes about 15 mm. Thus, it is required that the length B have to be at least 0.5 mm or less.

Figure 6:
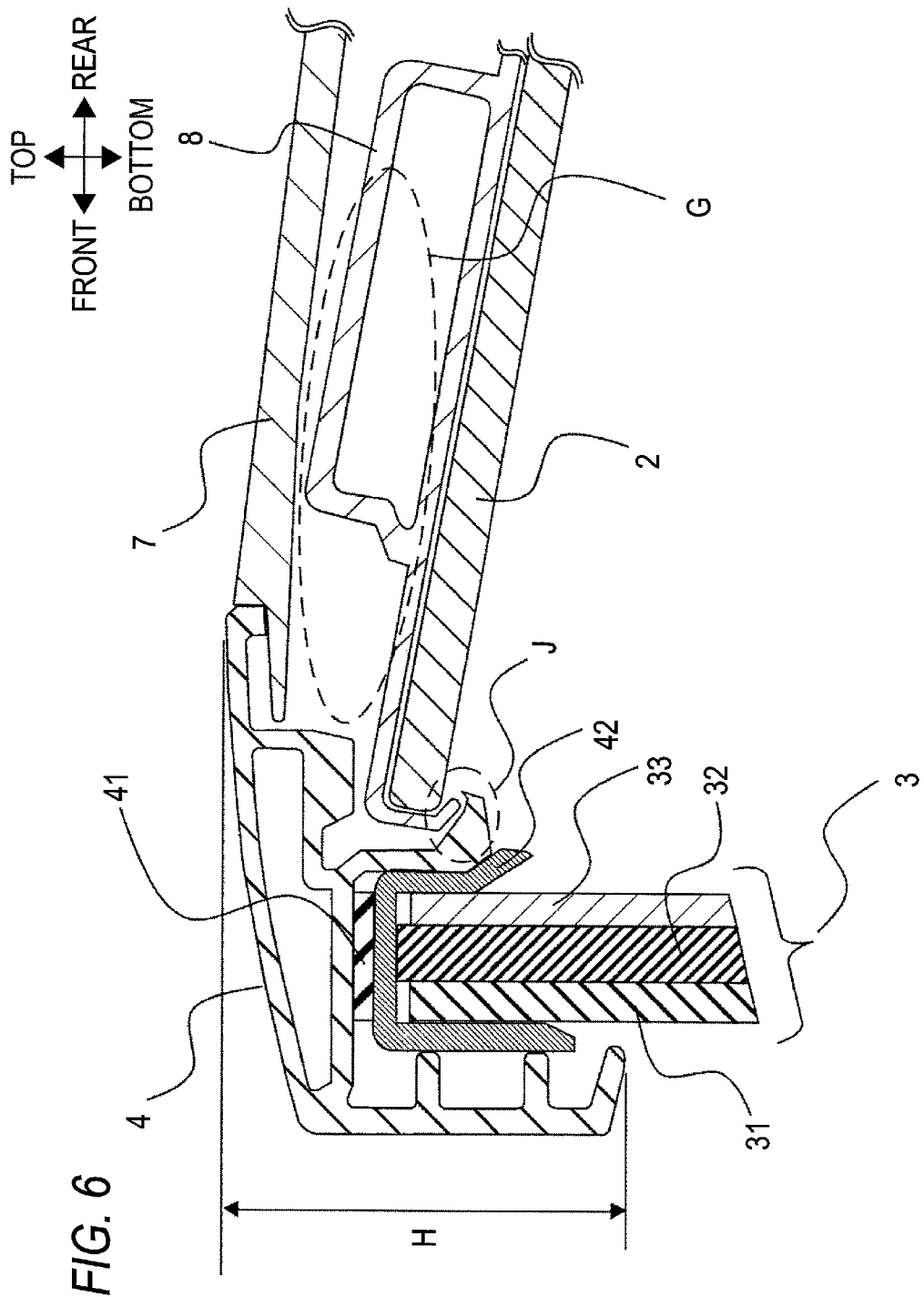
FIG. 6 is a sectional view showing a structure of an upper side of a screen frame according to the first illustrative aspect of the invention.

FIG. 6 is a sectional view showing a structure around an upper side of the screen frame 4 of the projection type image display apparatus, and FIG. 6 corresponds to a sectional view of an area "f" indicated with the dotted-dashed line in FIG. 3. The screen 3 includes a lenticular 31, a glass screen 32 and a Fresnel lens 33. The lenticular 31 and the Fresnel lens 33 are made of resin-based plastics and the glass screen 32 is made of glass. A clip 42 sandwiches and bundles the three thin plates and prevents friction between the screen 3 and the screen frame 4. A spacer 41 is sandwiched between the screen frame 4 and a part or an entire of the clip 42.

For space-saving and simple designing, a height H of the screen frame 4 is preferably 30 mm or less. When the height H of the screen frame 4 is made to be small, it is also necessary to narrow a space G between the second folding mirror 2 and the rear cover 7 and to form a shape of the mirror holder 8 within the limited space.

In related cases, the screen frame 4 and the mirror holder 8 are generally made of aluminum extrusion, because it is possible to lengthen uniformly with a complicated sectional shape and to reduce a warping, and the design characteristic is superior. Because it is possible to make a complicated sectional shape, the aluminum extrusion is effectively used as a reinforcement material in the limited space.

In the case of an ultra large display apparatus of 75 inches with a frame width of 30 mm or less, even when the sectional shape is appropriately modified, it is quite difficult to secure the sufficient strength and to suppress the deformation of the second folding mirror 2 less than 0.5 mm. Thus, as shown in FIG. 6, the mirror holder 8 and an upper side part of the screen frame 4 are connected by a connection part J, and the screen 3 and the screen frame 4 are connected via the spacer 41 and the clip 42, so that a part of a weight of the second folding mirror 2 is distributed to the screen 3. Accordingly, the upper side part of the screen 3 holds the front side part of the second folding mirror 2, thereby maintaining the strength. As a result, it is possible to suppress the deformation of the second folding mirror 2 less than 0.5 mm.

In the above configuration of the screen 3, since the lenticular 31 and the Fresnel lens 33 are made of plastics and have low strength, they are deformed when load is applied thereto. Therefore, the load applied to the screen 3 is preferably applied to the glass screen 32, which has the highest rigidity of the materials configuring the screen 3. Accordingly, the glass screen 32 is preferably made to be slightly greater than the lenticular 31 and the Fresnel lens 33 so that the height of the glass screen 32 is higher than the upper ends of the lenticular and the Fresnel lens. In the meantime, when the glass is arranged at the intermediate layer of the three-layer configuration, it is possible to prevent scattering fragments even when the glass is broken.

In the meantime, films of the Fresnel lens and the lenticular having a sheet shape may be adhered on the surfaces of the glass, and one sheet of the above may be adhere and the other sheet may be made of a plastic sheet. In addition, the Fresnel lens and the lenticular may be formed on films coated on the glass surfaces. Furthermore, the glass surfaces may be processed to form the Fresnel lens and the lenticular.

In this illustrative aspect, a part of the weight of the second folding mirror 2 is distributed to the glass screen 32. However, the other materials, which are clear and have high rigidity, may be used. For example, plastic materials having high rigidity such as acryl and polycarbonate may be used. Additionally, although the three-layer configuration is used in this illustrative aspect, the Fresnel lens or lenticular may be formed on a surface of the plastic material having high rigidity.

Meanwhile, since the glass has low hygroscopic property and low coefficient of expansion, the glass is little distorted even under conditions of humidity or temperature change. As a result, it is possible to maintain the position of the screen with high precision. Also considering the size expansion of the plastics caused by the moisture or heat, the glass screen 32 is preferably made to be slightly greater than the lenticular 31 and the Fresnel lens 33.

According to the projection type image display apparatus configured as described above, the front side part of the folding mirror 2 and the screen frame 4 are connected to each other by the mirror holder 8, a part of the weight of the second folding mirror 2 is distributed to the screen 3 through the mirror holder 8, the screen frame 4, the spacer 41 and the clip 42, and the front side part of the folding mirror is held by the screen 3. Therefore, the deformation of the second folding mirror 2 is suppressed, so that it is possible to achieve a high-definition image having little distortion or blur of an image.

Additionally, the screen 3 is configured by a plurality of screens of materials having different rigidities, and the glass screen 32 has the highest rigidity of the plurality of screens. Thus, it is possible to achieve a projection type image display apparatus having little distortion or blur of an image, even when load is applied to the screen 3.

Additionally, the screen 3 includes the plurality of screens formed materials having different hygroscopic properties and coefficients of expansion. The glass screen has the lowest hygroscopic property and coefficient of expansion in the plurality of materials, so that the distortion of the screen caused by the moisture or heat is reduced. Therefore, it is possible to achieve a projection type image display apparatus having little distortion or blur of an image.

Additionally, the screen 3 is used as the reinforcement member, so that it is not necessary to provide a rigid reinforcement structure adjacent to the screen frame that also serves as a design frame of the upper part of the screen. Thus, it is possible to hold the folding mirror 2 with space-saving.

Therefore, since it is possible to be narrow a width of the design frame, it is possible to achieve a projection type image display apparatus having a simple design.

Additionally, since the excessive strength is not required for the screen frame 4 and the mirror holder 8, it is possible to reduce the weight of the screen frame 4 and the mirror holder 8, so that it is possible to achieve a light and economical projection type image display apparatus. Additionally, even when the size of the screen 3 or thickness of the mirror 2 has variations, it is possible to adjust easily by changing the thickness of the spacer 41.

Second Illustrative Aspect

In the projection type image display apparatus of the first illustrative aspect, the end portion of the second folding mirror 2 is connected to the screen frame 4. Since the optical elements are fixed in the optical system support member 5, an adjustment mechanism for the folding mirror is not required, and it is possible to suppress the problem that an image defect is caused by cutting fragments during the adjustment caused in the related art. However, the cutting fragments are generated caused by frictions of the connection part J while delivering the apparatus, then the cutting fragments may be adhered to the screen 3 or second folding mirror 2 and may cause an image defect. In view of the above, a projection type image display apparatus of this second illustrative aspect reduces the image defect with connecting a backside of the folding mirror 2 and the screen frame 4.

Figure 7:
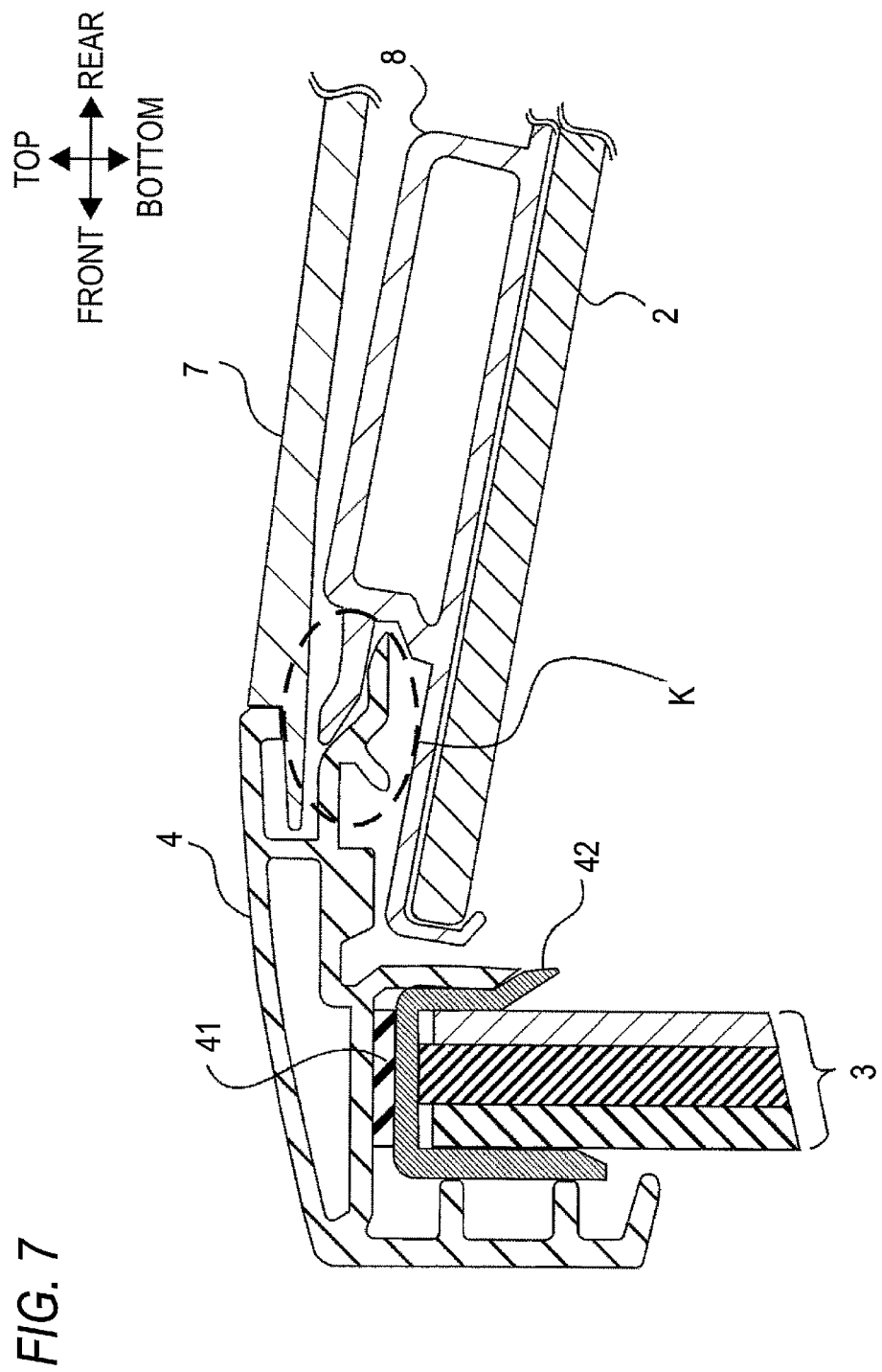
FIG. 7 is a sectional view showing a structure of an upper side of a screen frame according to a second illustrative aspect of the invention.

FIG. 7 shows a state that the connection part J in the first aspect is moved to a connection part K of the mirror holder 8, which is the front side part of the backside of the second folding mirror 2, in the second aspect of the present invention. The connection part J of FIG. 6 is positioned at the image reflecting side of the second folding mirror 2, so that it is close to the reflected light forming an image and also close to the image projection part of the screen 3. Although the cutting fragments may be generated by friction of the connection part J in the first aspect of the present invention, the connection part J is moved to the connection part K in the second aspect of invention. Accordingly, even when the cutting fragments are generated by the connection part K, the cutting fragments are adhered to a backside of the mirror and does not related to the image.

In the projection type image display apparatus configured as described above, because the connection part K is positioned at the backside of the mirror, even when the cutting fragments are generated by the frictions of the connected part of the mirror holder 8 and the screen frame 4, they are not adhered to the screen 3 or the folding mirror 2. As a result, it is possible to achieve a projection type image display apparatus having reduced a defect of a display image.

Third Illustrative Aspect

In the projection type image display apparatus of the first illustrative aspect, an error of the thickness of the screen and the mirror is corrected by adjusting the thickness of the spacer 41. However, in this third illustrative aspect, a projection type image display apparatus having no spacer 41 will be described.

Figure 8:
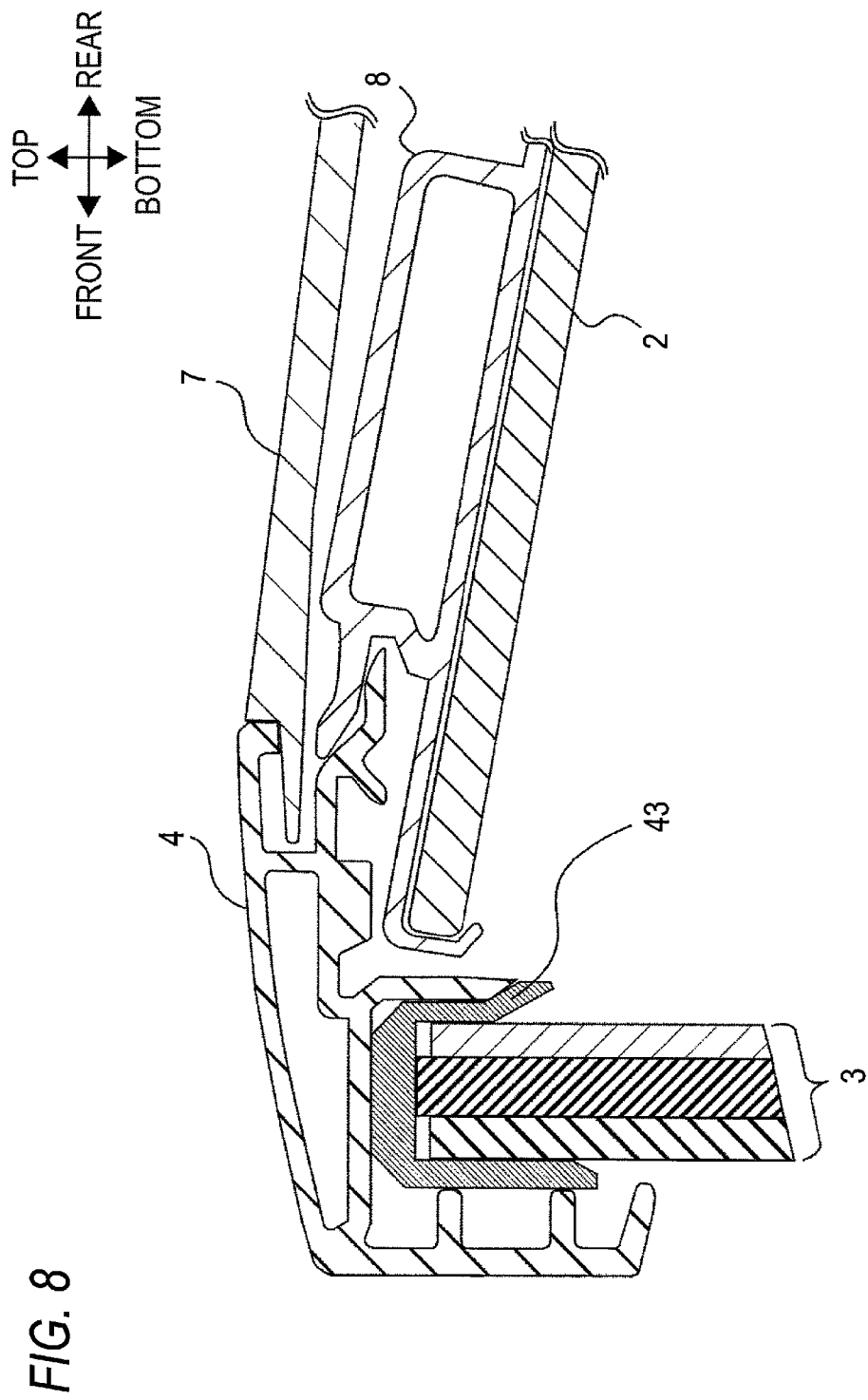
FIG. 8 is a sectional view showing a structure of an upper side of a screen frame according to a third illustrative aspect of the invention.

When the size of the glass screen 32 is changed due to the non-uniformity of size etc. in FIG. 6, the position of the second folding mirror 2 is easily adjusted into a predetermined position by changing the thickness of the spacer 41. However, for example, when there is an angle adjustment mechanism of the mirror, such as a screw provided at a rear end of the second folding mirror 2, or when there is an electric circuit, which has a function for correcting a positional deviation of the second folding mirror 2, a clip 43 combined the clip and the spacer may be used as shown in FIG. 8. Meanwhile, it may be adjusted by changing the thickness of the clip 43 without a mirror angle adjustment mechanism.

In the projection type image display apparatus configured as described above, it is possible to omit the spacer, to reduce the number of parts and to simplify the assembling process. Therefore, it is possible to achieve an economical projection type image display apparatus.

Fourth Illustrative Aspect

In the projection type image display apparatuses of the first to third illustrative aspect, the size of the glass screen is made to be slightly greater in order to suppress the deformation of the lenticular or the Fresnel lens. However, in this fourth illustrative aspect, a projection type image display apparatus, in which the lenticular or the Fresnel lens are not deformed even when the size of the glass screen is not uniform, will be described.

Figure 9:
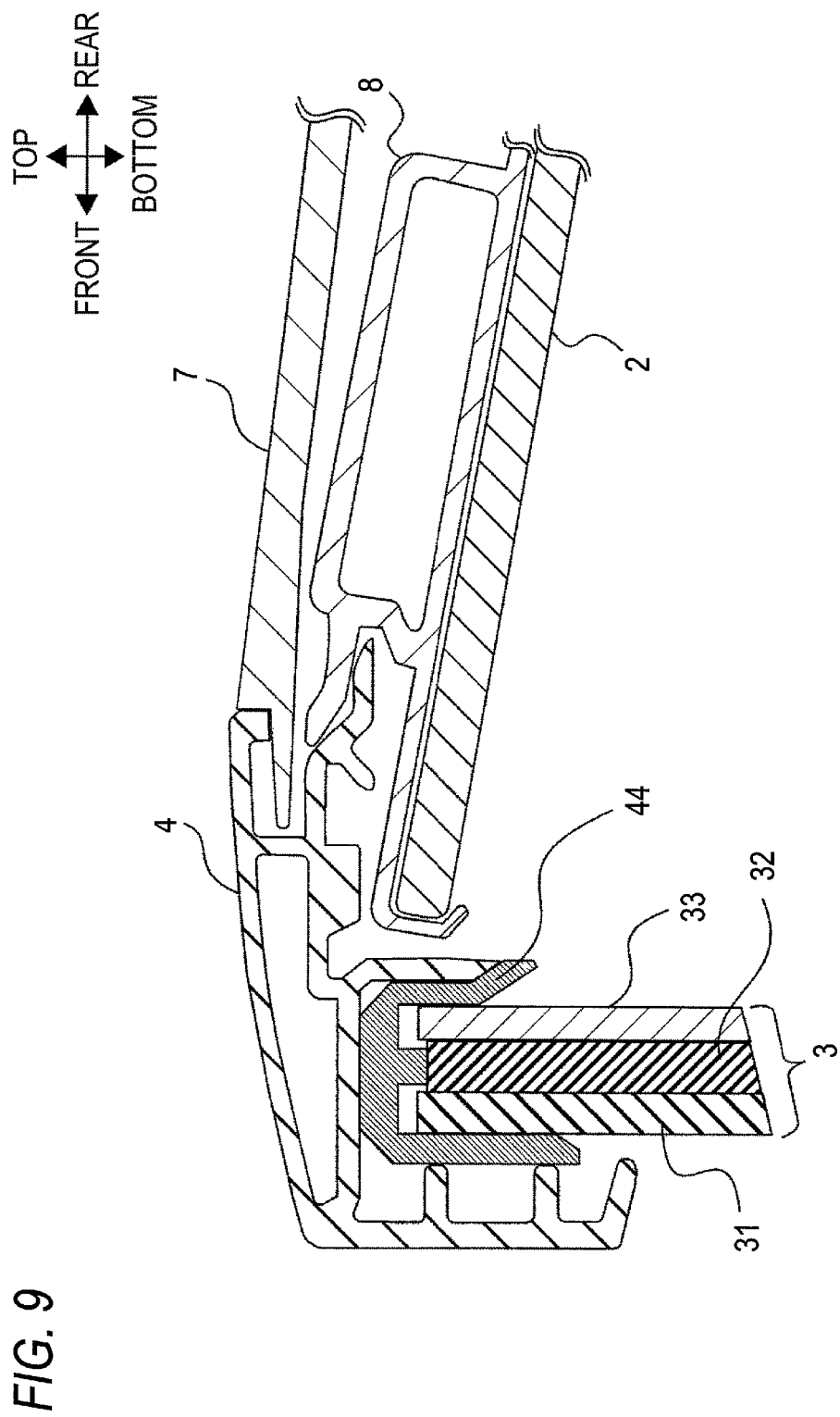
FIG. 9 is a sectional view showing a structure of an upper side of a screen frame according to a fourth illustrative aspect of the invention.

As shown in FIG. 9, an inner side of the clip 44 (end face side of the screen 3) includes a convex part having a protrusion shape. The convex part is preferably contacted to an upper end surface of the glass screen 32, which has at least one of the highest rigidity, the lowest hygroscopic property and the coefficient of expansion in the materials included the screen 3. Therefore, a size of the protrusion is preferably equal to or smaller than the thickness of the glass screen 32. Accordingly, the size of the glass screen 32 may be equal to or smaller than the lenticular 31 and the Fresnel lens 33.

In the projection type image display apparatus configured as described above, even when the sizes of the respective thin plates, which includes the glass screen 32, the lenticular 31 and the Fresnel lens 33, have errors or varieties, it is possible to suppress the deformation of the lenticular 31 and the Fresnel lens 33. Therefore, it is possible to achieve a projection type image display apparatus having little distortion or blur of an image.

What is claimed is:

1. A projection type image display apparatus comprising:
   an optical engine that projects an image;
   an image display screen that displays an image of projection light projected from the optical engine;
   a folding mirror that reflects the projection light projected from the optical engine toward the image display screen;
   an optical system support member that holds the optical engine, a rear side part of the folding mirror and the image display screen;
   a screen frame that holds at least an upper side part of respective sides of the image display screen; and
   a mirror holder, which is fixed to the folding mirror, and which connects the front side part of the folding mirror and the screen frame of the upper side part,
   wherein the image display screen holds a front side part of the folding mirror by an upper side part of the image display screen,
   wherein the image display screen holds the front side part of the folding mirror via the screen frame of the upper side part and the mirror holder,
   wherein, in a connection part, the screen frame directly makes contact with the mirror holder, and
   wherein, in the connection part, a portion of the screen frame is provided in a lower side of a portion of the mirror holder.

2. The projection type image display apparatus according to claim 1,
   wherein the image display screen includes a plurality of screens, and
   wherein one of the screens differs from the other of the screen sheets in at least one of rigidities, hygroscopic properties and coefficients of expansion.

3. The projection type image display apparatus according to claim 2,
   wherein one of screens has a glass screen that is used as a screen material having at least one of the highest rigidity, the lowest hygroscopic property and the lowest coefficient of expansion in the plurality of screens.

4. The projection type image display apparatus according to claim 2,
   wherein one screen, whose material has at least one of the highest rigidity, the lowest hygroscopic property and the lowest coefficient of expansion in the plurality of screens, has a size greater than other screens in the plurality of screens.

5. The projection type image display apparatus according to claim 2, further comprising
   a clip, which is provided the upper side part of the image display screen, and which bundles the plurality of screens, and
   a convex part, which is provided at inner side of the clip, and which contacts an upper end surface of a screen having at least one of the highest rigidity, the lowest hygroscopic property and the coefficient of expansion in the plurality of the screens.

6. The projection type image display apparatus according to claim 1, further comprising
   the connection part, which is provided at backside of the folding mirror, and which connects the front side part of the folding mirror and the screen frame of the upper side part via the mirror holder.

7. The projection type image display apparatus according to claim 1, further comprising
   a spacer provided between an upper end surface of the image display screen and the screen frame facing to the upper end surface of the image display screen.

* * * * *